Aug. 31, 1965  E. V. GARNETT  3,203,640
WIRE TENSIONING TRAILER
Original Filed Feb. 19, 1960  9 Sheets-Sheet 1

INVENTOR.
EDWARD V. GARNETT
BY
Horace B. Van Valkenburgh
ATTORNEY

Aug. 31, 1965 E. V. GARNETT 3,203,640
WIRE TENSIONING TRAILER
Original Filed Feb. 19, 1960 9 Sheets-Sheet 3

INVENTOR.
EDWARD V. GARNETT
BY
Horace B. Van Valkenburgh
ATTORNEY

Aug. 31, 1965  E. V. GARNETT  3,203,640
WIRE TENSIONING TRAILER

Original Filed Feb. 19, 1960  9 Sheets-Sheet 4

INVENTOR.
EDWARD V. GARNETT
BY
Horace B. VanValkenburgh
ATTORNEY

Aug. 31, 1965   E. V. GARNETT   3,203,640
WIRE TENSIONING TRAILER

Original Filed Feb. 19, 1960   9 Sheets-Sheet 6

INVENTOR.
EDWARD V. GARNETT
BY
Horace B. VanValkenburgh
ATTORNEY

Aug. 31, 1965     E. V. GARNETT     3,203,640
WIRE TENSIONING TRAILER
Original Filed Feb. 19, 1960     9 Sheets-Sheet 7
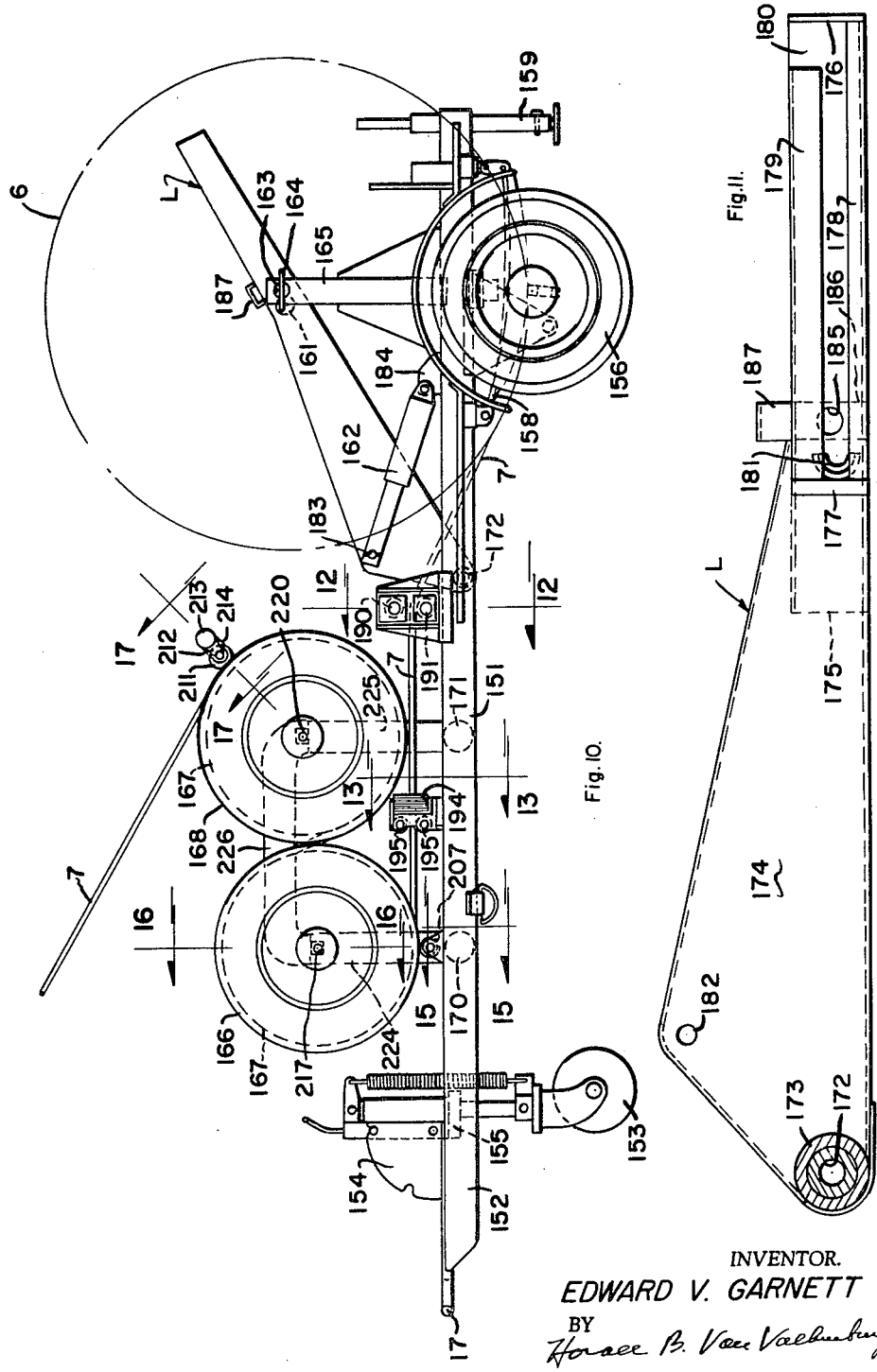
INVENTOR.
EDWARD V. GARNETT
BY
Horace B. Van Valkenburgh
ATTORNEY

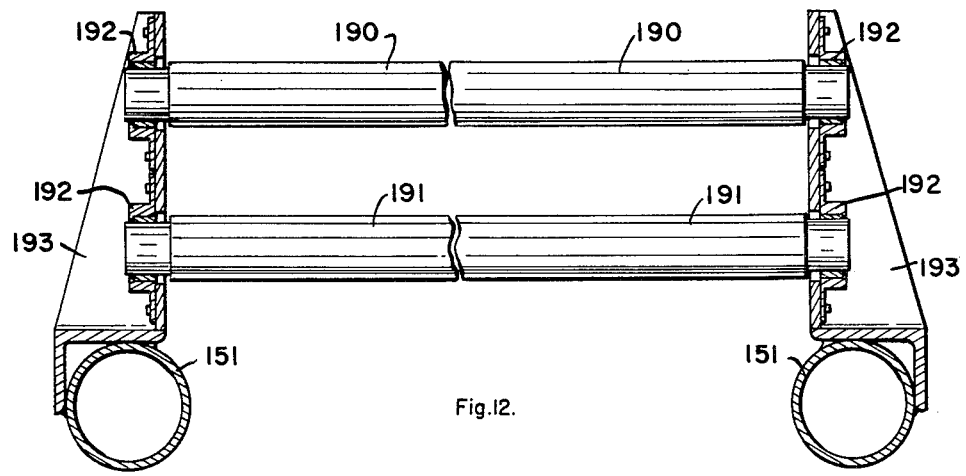
Fig. 12.
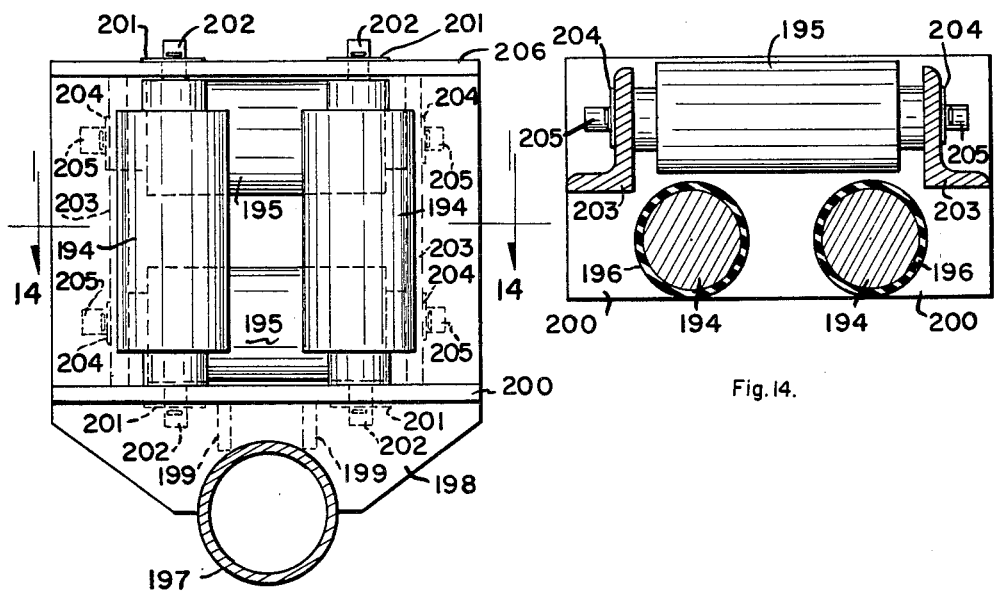
Fig. 13.
Fig. 14.
INVENTOR.
EDWARD V. GARNETT
BY
Horace B. VanVackenburgh
ATTORNEY Aug. 31, 1965   E. V. GARNETT   3,203,640
WIRE TENSIONING TRAILER Original Filed Feb. 19, 1960   9 Sheets-Sheet 9

INVENTOR.
EDWARD V. GARNETT
BY
Horace B. Van Valkenburgh
ATTORNEY

United States Patent Office 3,203,640
Patented Aug. 31, 1965

1

3,203,640
WIRE TENSIONING TRAILER
Edward V. Garnett, Denver, Colo., assignor to Eaton Metal Products Company, a corporation of Nebraska
Original application Feb. 19, 1960, Ser. No. 9,956, now Patent No. 3,073,574, dated Jan. 15, 1963. Divided and this application Feb. 12, 1962, Ser. No. 172,454
6 Claims. (Cl. 242—86.7)

This invention relates to wire stringing equipment and more particularly to a tension trailer used in installing electrical conductors, as on poles or towers. This application is a division of my copending application Serial No. 9,956, filed Ferbruary 19, 1960, now U.S. Patent No. 3,073,574.

For the installation of electrical conductors, such as transmission lines which are normally supported by poles or towers, a large saving in labor costs can be made by using equipment which will string or place a conductor or a number of conductors simultaneously, for a considerable distance, such as one half mile. Instead of placing one or more wires individually on position from pole to pole, or tower to tower, one or more tensioning cables or ropes can be threaded through supports on the poles or towers for a considerable distance, then each attached to an individual conductor and sufficient tension placed on the pulling rope so that the conductor will be under tension at all times while being pulled into position. Conveniently, the pulling cable is a rope of non-conductive material, such as hemp or manila, and will therefore be referred to hereinafter as a rope. Such a rope can also be used to advantage in installing conductors which are to take the place of previous conductors, while the latter remain in service, since a rope of hemp or the like will not be affected by proximity to the conductors carrying current and the new conductors, during installation, can be spaced sufficiently from the conductors carrying current that little danger of accidental contact with the conductors carrying current will exist. Sufficient tension has, of course, to be placed on the conductors being installed so that they will remain tight at all times. The tension on a number of conductors being pulled simultaneously should be substantially equal, while the tension should also be regulated so that the conductors being placed will remain tight, but the tension force will not be so great as to involve the danger of breaking a pulling rope or a conductor being placed. For higher voltages, such conductors are usually uninsulated wires, so that when replacement conductors are being installed, contact of an uninsulated wire being installed with a wire carrying current most be avoided. Copper conductors have been used for many years, but aluminum conductors are being used more and more. Since both copper and aluminum have a lower tensile strength than steel, the use of rope formed of hemp or the like has an additional advantage, in that rope may be used which has a tensile strength more nearly equal to that of the conductor, although of course of a larger size.

For installing electrical conductors over a long span and particularly a number of conductors simultaneously, two types of equipment are desirable. One type of equipment pulls in the pulling ropes, which are conveniently wound onto drums, but for a half mile length of rope, the pulling ropes should be guided onto the drums so as to be placed thereon in even layers. Since electrical conductors or wires are normally shipped and handled while on reels, it is most convenient to unwind such a conductor from the shipping reel. Thus, the other type of equipment should accommodate a plurality of reels and also produce a braking effect on each reel, so as to permit the wires to be unwound under tension. Of course, the braking effect should be as uniform as possible for all reels. Since each type of equipment is moved from place to place, or is moved to different locations, each of the above types of equipment should be mobile. Such equipment can be mounted on a truck or other vehicle, although it is more economical to mount the same on trailers which can be pulled about by a truck or other self-propelled vehicle.

In certain situations, as when only one conductor is to be replaced or strung at one time, a pulling rope can be wound in on a winch drum mounted on a truck or other vehicle, but regulated tension must be applied to the conductor as it is unwound from a reel. Thus, tensioning equipment primarily adapted to handle a single reel is of advantage in such situations. Such tensioning equipment can be mounted on a self-propelled vehicle, such as a truck, but is more conveniently mounted on a trailer which can be towed by a truck or the like, such as the truck on which the pulling winch is mounted.

Among the objects of the present invention are to provide novel wire stringing equipment, particularly adapted for use in the installation of electrical conductors or wires, on poles, towers or the like; to provide such equipment which is convenienty mounted on a trailer; to provide one form of such equipment which will handle a plurality of conductors simultaneously; to provide such equipment which can handle a plurality of reels for simultaneously unwinding conductors on the reels under tension; to provide such tensioning equipment which produces a braking effect on the reels being unwound; to provide such equipment in which the braking effect on a plurality of reels can be made substantially uniform; to provide such tensioning equipment which can be used to transport the full reels to the place of use; to provide such tensioning equipment on which the full reels may be readily loaded and empty reels unloaded; to provide an additional form of such tensioning equipment which may be used to produce tension on a single conductor; to provide such single conductor tensioning equipment on which a full reel may readily be loaded and an empty reel unloaded; and to provide tensioning equipment which is sturdy in construction and reliable in operation.

The foregoing and additional objects of this invention, together with the novel features thereof, will become apparent from the description which follows, taken in connection with the accompanying drawings, in which:

FIG. 10 is a side elevation of the tension trailer of FIG. 9;

FIG. 11 is a side elevation, on an enlarged scale, of a lifting arm for the reel shaft and forming a part of the tension trailer of FIG. 9;

FIG. 12 is a condensed vertical section, on an enlarged scale, taken along line 12—12 of FIG. 10 and showing particularly a pair of horizontal guide rollers for the conductor;

FIG. 13 is a fragmentary vertical section, on an enlarged scale, taken along line 13—13 of FIG. 10 and showing particularly a pair of vertical guide rollers and an associated pair of horizontal rollers for the conductor;

FIG. 14 is a horizontal section, taken along line 14—14 of FIG. 13;

Figure 9:
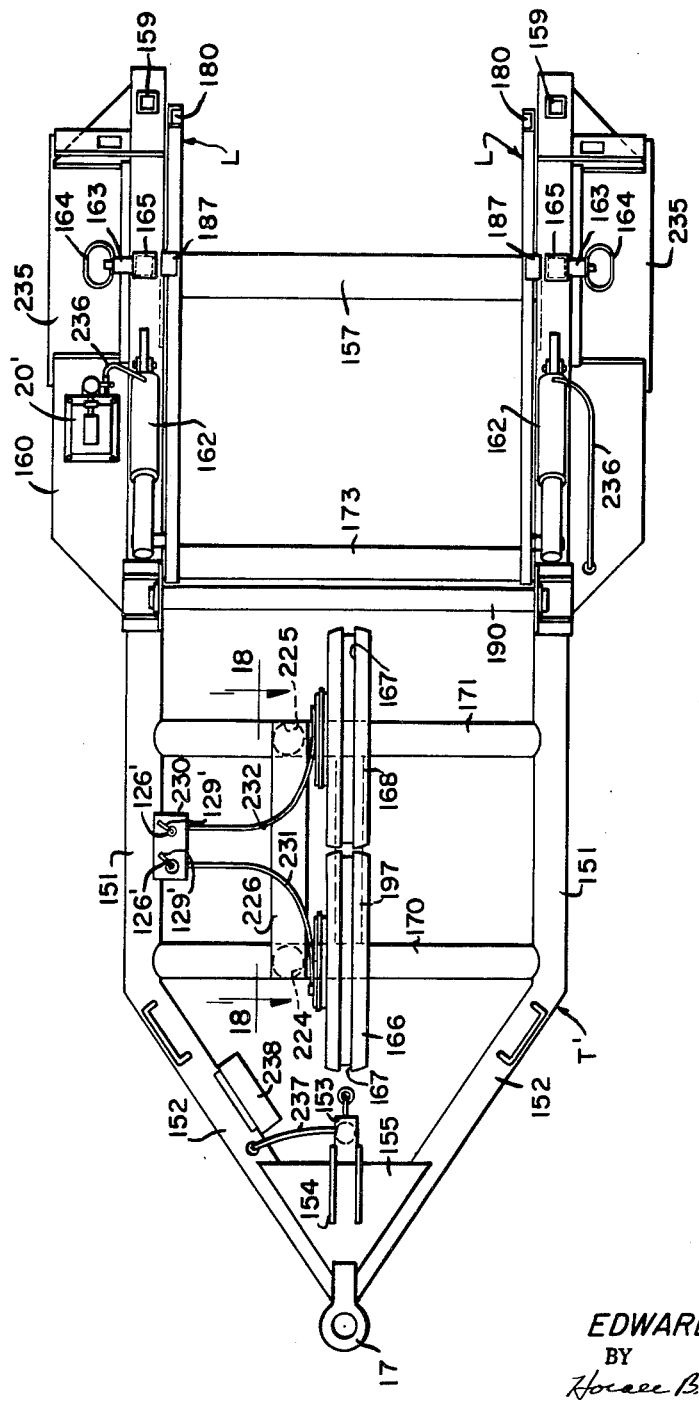
FIG. 9 is a top plan view, on an enlarged scale, of the tension trailer of FIG. 8, with the reel on which the conductor is mounted being omitted for clarity of illustration.
Figure 17:
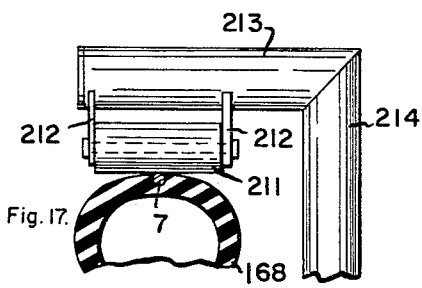
Figure 18:
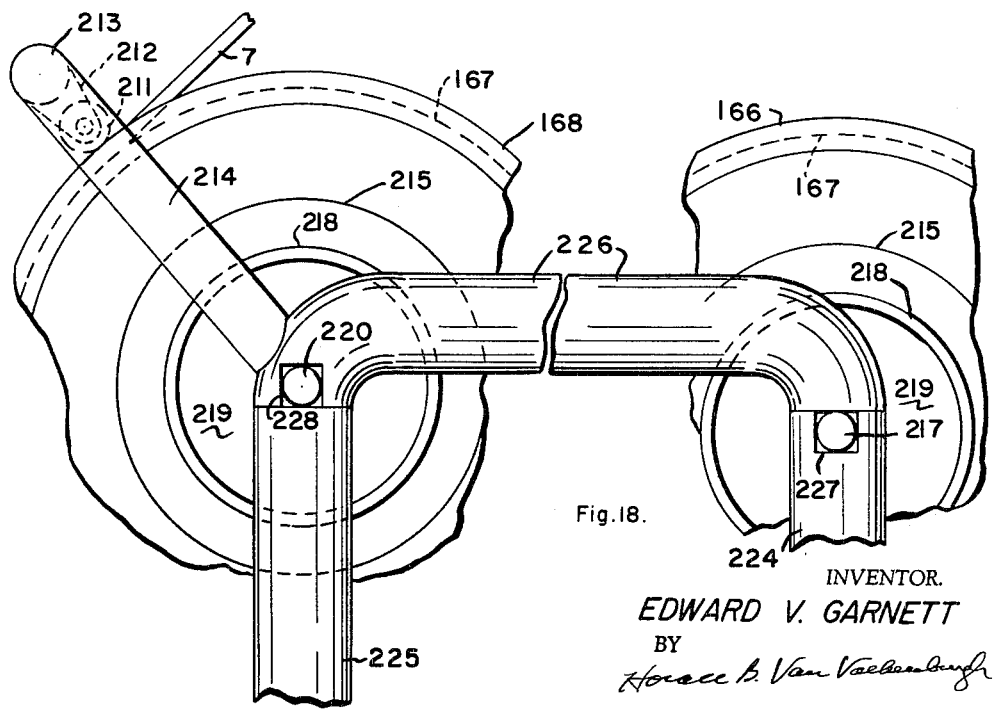

FIG. 17 is a fragmentary oblique section, on an enlarged scale, taken along line 17—17 of FIG. 10 and showing an upper roller which holds the conductor in engagement with a second grooved resilient annulus, such as another tractor tire; and FIG. 18 is a fragmentary, condensed side elevation, on an enlarged scale and taken from the position of line 18—18 of FIG. 9, showing particularly the supports for the two resilient grooved annuli and the upper roller.

Figure 1:
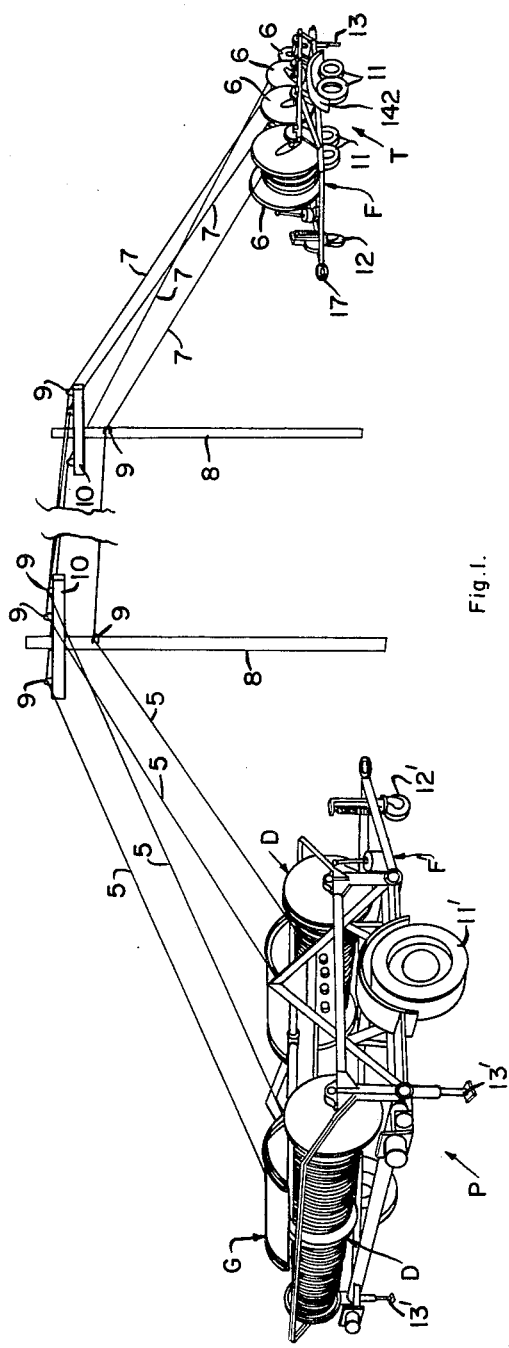
FIG. 1 is a condensed, perspective view of multiple conductors, wire stringing equipment which includes a wire tensioning trailer constructed in accordance with this invention and illustrating the operation of the same, the normal distance between a pulling trailer and a tension trailer being considerably shortened for clarity of illustration.

As illustrated in FIG. 1, a wire tensioning trailer T constructed in accordance with this invention is conveniently utilized with a pulling trailer P, disclosed in my above-mentioned U.S. Patent No. 3,073,574, on which is mounted a pair of dual or double drums D on which ropes 5 are wound and guided onto the drums by a rope winding guide G, the tension trailer T having four reels 6 mounted thereon from which conductors 7 are unwound under tension. Three of conductors 7 may be adapted, when installed on poles 8, to carry the three phases of three phase current, while the fourth conductor 7 may be a ground wire, as in a conventional Y circuit. Thus, three of ropes 5 followed by the respective conductors 7 are pulled through insulators 9 mounted on cross arms 10, while the fourth wire may be pulled through insulators 9 mounted on poles 8. It will be understood that, for clarity of illustration, only the first and last poles 8 are shown, since there will normally be a considerable number of poles, as over a half mile stretch. It will also be understood that the conductors may be strung on transmission towers of various types, rather than on poles, while ropes 5 may be placed in pulleys or hooks through which wires 7 are pulled and later attached to more conventional insulators. Also, the initial installation of ropes 5 can conveniently be made by starting at the tension trailer T and moving the pulling trailer P along a roadway which parallels or is adjacent poles 8 and paying out ropes 5, as over a half mile stretch, during which the ropes may be carried or pulled up each pole or tower in turn and placed in insulators 9, or the pulleys or hooks through which the ropes are to be pulled. Then, the pulling trailer P is placed in position for pulling, the ropes 5 tightened and pulling may then proceed. In general, pulling trailer P is adapted to pull in the ropes 5, such as ¾ in. manila rope, simultaneously and each drum D is adapted to accommodate a sufficient length., such as 2500 ft., of each of two ropes while the rope winding guide G moves back and forth across the trailer to cause the rope to be laid onto the drums evenly. The tension trailer T is adapted to produce a resistance to rotation of each reel 6 which is approximately equal for each of the reels and is also equal to the desired pull on ropes 5, such as about 2000 lbs. As described in my U.S. Patent No. 3,073,574, the drums D are rotated through a transmission which is responsive to torque and therefore will cause drums D to slow down if the pull exceeds the desired value and to speed up if the pull becomes less than the desired value. A suitable rate of speed, for 2000 lb. tension in the ropes 5 and conductors 7, is that which will cause 2500 ft. of ropes 5 to be wound onto drum D in a time period of about 60 minutes. It will be understood that other values of the tension and other rates of speed may be used.

Figure 2:
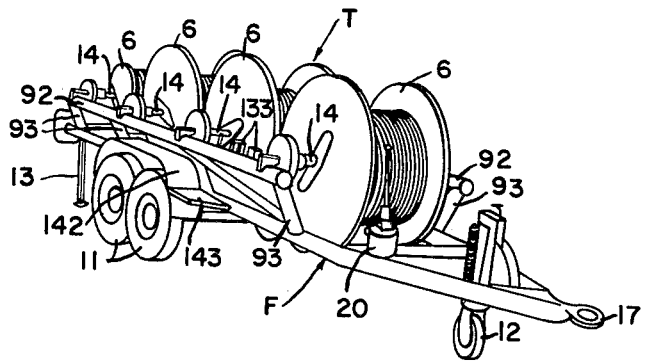
FIG. 2 is a perspective view, taken from one side and at the front of the tension trailer on FIG. 1.

As in FIGS. 1 and 2, tension trailer T includes a frame F which is conveniently supported by a pair of dual wheels 11 at each side and positioned centrally with respect to the four reels 6, while a retractable front wheel 12 and a pair of jack legs 13 at the rear are lowered during use to prevent fore and aft tipping of fram F, but raised during transportation. On frame F are mounted the parts necessary to support a shaft 14 for each reel 6 and to produce a braking effect against rotation of each shaft 14, so as to produce the desired tension of the cables 7 during pulling. As in FIG. 1, pulling trailer P includes a frame F′, preferably of tubular construction and supported by a pair of wheels 11′ mounted centrally with respect to drums D. A retractable front wheel 12′ and a pair of jack legs 13′ at the rear are raised during transportation and are lowered during use of the equipment for pulling, to prevent fore and aft tipping of frame F′ during the pulling operation. Wheels 11 of tension trailer T and wheels 11′ of pulling trailer P are conveniently conventional in construction, including pneumatic tires and brakes adapted to be connected to the brake control system of the vehicle used to tow the same, while the retractable front wheels 12 and 12′, as well as jack legs 13 and 13′, are also conveniently conventional in construction so that details of the construction need not be given, although a suitable retractable front wheel is disclosed in U.S. Patent No. 2,759,682 and suitable jack legs are disclosed in U.S. Patents Nos. 2,759,682 and 2,913,194. Conveniently, a pair of drums D are rotatably mounted at the forward end of frame F′ and a second pair of drums are mounted at the rear of frame F′ and are each provided with guides G for guiding ropes 5 back and forth across the drums. Of course, the pulling trailer P may be provided with more or less drums, as needed.

Figure 4:
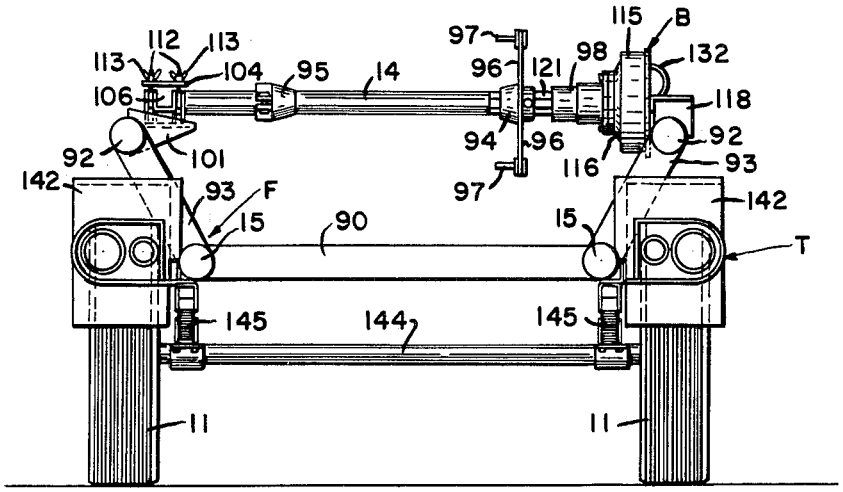
FIG. 4 is a rear elevation of the tension trailer of FIG. 3.
Figure 3:
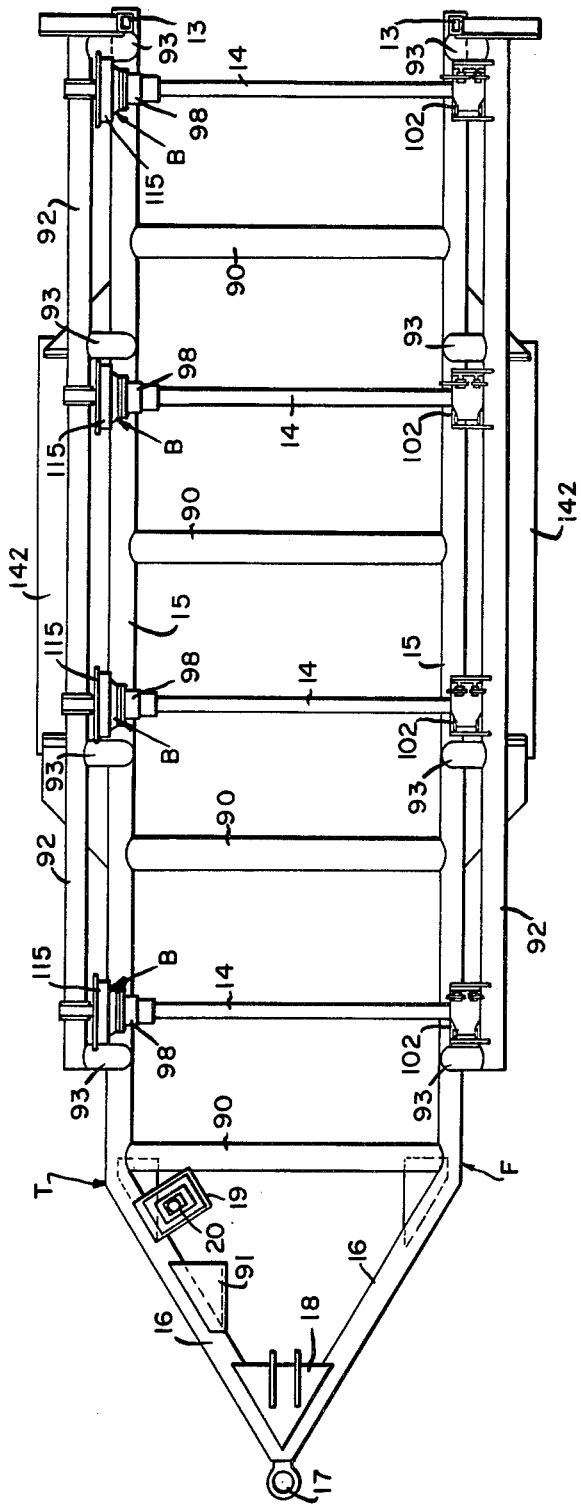
FIG. 3 is a top plan view, on an enlarged scale, of the tension trailer of FIG. 2, with the reels on which the conductors are mounted being omitted for clarity of illustration.
Figure 5:
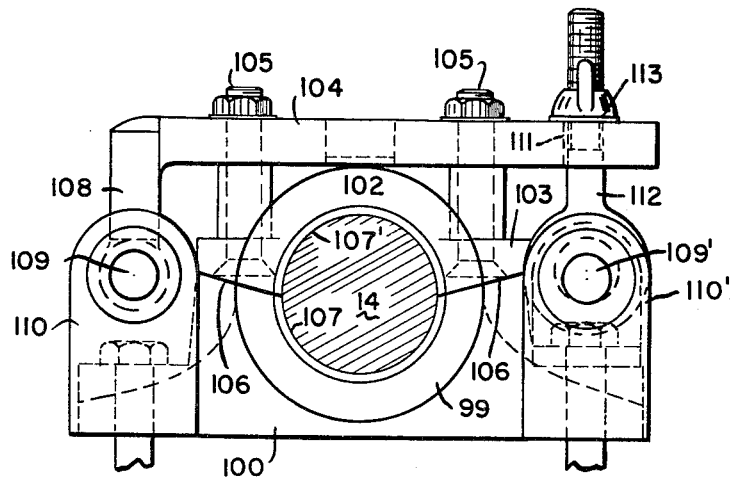
FIG. 5 is an end view, on an enlarged scale, of a bearing and associated parts provided for one end of each of the shafts on which the reels are mounted in the tension trailer.

As in FIGS. 3 and 4, the frame F of the tension trailer T may include side beams 15, between which cross beams 90 extend, with angle beams 16 extending forwardly in converging relation from the front end of the respective side beam 15, the angle beams 16 being connected together at the front end, a hook 17 being attached thereto for towing purposes. A plate 18, for mounting the front retractable leg 12 of FIG. 2, may be attached to the angle beams 16, while a bracket 19 may be attached to the curb side angle beam 16 to support a hand pump 20, for supplying hydraulic pressure to the retractable front leg 12 of FIG. 2. A bracket 91 may also be attached to the curb side angle beam 16 for mounting a hand operated parking brake for wheels 11 of FIGS. 2 and 4. The reel shafts 14, with the reels 6 mounted thereon as in FIG. 2, are supported by upper side beams 92, while struts 93 extend upwardly and outwardly from the lower side beams 15 to the upper side beams 92. The position of the supports for the reel shafts 14 are preferably interposed with the positions of the cross beams 90, so that the reels may extend downwardly between the cross beams. Each of lower side beams 15, upper side beams 92, cross beams 90, angle beams 16 and struts 93 are conveniently tubular and connected together by welding. Each reel shaft 14, as in FIG. 4, may be provided with a conical sleeve 94 for engaging the hole in one side of the reel drum and an adjustable, conical sleeve 95 for engaging the hole in the opposite side of the reel drum, while sleeve 94 may be provided with a pair of laterally extending arms 96, each provided with an axially extending pin 97 for engaging appropriate holes in the reel drum to mechanically connect the shaft 14 with the corresponding reel drum so that the braking effect produced by a braking device B will be transmitted in a positive manner to the reel. One end of each reel shaft 14 is inserted in a sleeve 98 of the braking device B and the opposite end is supported by a split bearing, the lower half 99 of which is mounted in a block 100 of FIG. 5, which is attached, as by bolts, to a bracket 101 mounted on the corresponding upper side beam 92, as in FIG. 4. The upper half 102 of the split bearing, as in FIG. 5, is mounted in a block 103 attached to a lever 104 by bolts 105, with the intersecting faces 106, between the blocks 100 and 103 and the bearings 99 and 102, preferably extending angularly and downwardly toward the center at each side to insure alignment of the upper and lower bearing halves when the lever 104 is moved to closed position. Also, each half 99 and 102 of the split bearing may be provided with a bushing 107 and 107′, respectively. Link 104 is provided with a right angle arm 108 pivoted on a pin 109, mounted between ears 110 extending upwardly in spaced relation from block 100, the opposite end of lever 104 being provided with a pair of slots 111 adapted to receive a pair of bolts 112. Each bolt 112 has an eye at one end, so as to be pivotal about a pin 109′ extending between ears 110′, which extend upwardly in spaced relation from block 100, while the opposite end of each bolt 112 is threaded to receive a wing nut 113. As will be evident, when wing nuts 113 are loosened, bolts 112 may be moved out of slots 111, then lever 104 swung upwardly and to the left, as viewed in FIG. 18, so as to separate the two halves of the split bearing and permit the removal of the reel shaft 14 having an exhausted reel thereon, after which the reel shaft 14 may be removed from the empty reel and placed in a full reel. Then, the full reel may be hoisted in position, with one end being slipped into sleeve 98 of braking device B and the opposite end lowered into the lower half 99 of the split bearing. Then, the lever 104 may be swung to closed position, the bolts 112 swung upwardly into place and the wing nuts 113 tightened.

Figure 6:
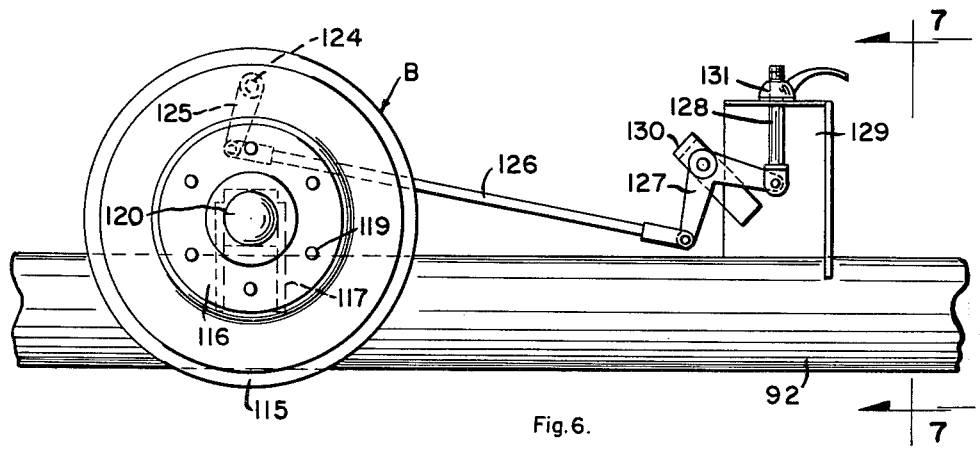
FIG. 6 is a side elevation, on an enlarged scale, of a braking device provided for the opposite end of each of the reel shafts.
Figure 7:
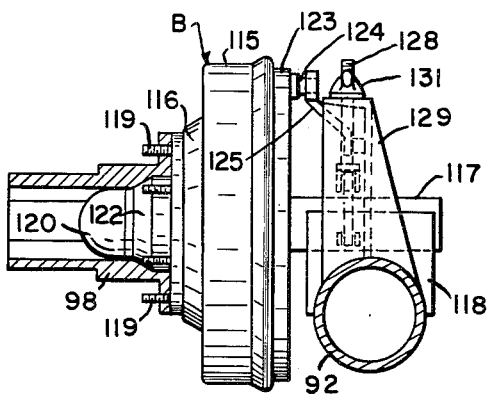
FIG. 7 is an end elevation of the braking device of FIG. 6, taken from the position of line 7—7 of FIG. 6.

As in FIGS. 6 and 7, each braking device B includes a brake drum 115 mounted on a hub 116, in turn mounted for rotation, as by roller bearings, on a stub shaft 117 which is fixed and is mounted on a bracket 118 attached to the corresponding upper side beam 92, as by welding. Hub 116 is provided with a plurality of axially extending studs 119 for attachment of sleeve 98 and conveniently also with a rounded inner hub 120 to facilitate centering of sleeve 98, the interior of which is noncircular, such as hexagonal, to provide a mechanical connection with end 121 of reel shaft 14, which corresponds in shape thereto. The sleeve 98 is also provided with an inner flange having holes through which studs 119 extend and a conical surface on the inside, adapted to engage a corresponding conical surface 122 of hub 116, just inwardly of abutment 120. A brake backing plate 123 is also mounted on stub shaft 117 and carries a brake band assembly which is conventional and therefore not shown, the brake band assembly being controlled by a pivot rod 124 provided with an angularly extending arm 125, the outer end of which is pivotally connected to a linkage rod 126. The opposite end of rod 126 is pivotally connected to one arm of a forked link 127, the opposite arm of which is pivotally connected to an adjusting bolt or rod 128 which extends through a hole in a top flange of a bracket 129, also mounted on the corresponding upper side beam 92, while forked link 127 is pivoted centrally on an auxiliary bracket 130, conveniently attached to bracket 129. A greater or lesser braking effect of the brake band assembly within brake drum 115 is produced by turning a handle nut 131, which engages the threaded end of bolt 128. As will be evident from FIG. 6, tightening nut 131 against the upper flange of bracket 129 will cause forked lever 127 to pivot counterclockwise, as viewed in FIG. 6, thereby to pull rod 126 and arm 125 to the right and push the brake bands of the brake band assembly against the inside of drum 115. Similarly, loosening nut 125 will cause the brake band assembly to produce a lesser braking effect. In order to simplify the connection between the forked link 127 and the brake band assembly, a flexible wire cable 132 of FIG. 4 may be substituted for the offset arm 125 and rod 26. This permits the forked link 127 and adjusting nut to be installed at a more convenient position, such as on a bracket 133 mounted on the inside of upper side rail 92, as in FIG. 2. Wire cable 132 comprises a conventional flexible push-pull cable, i.e., a central wire surrounded by a hollow flexible cable having conventional convolutions. The braking device of FIGS. 6 and 7 is mechanical and thus the braking effect against the rotation of each reel being unwound must be adjusted manually, but this can be done readily.

As in FIGS. 2 and 4, tension trailer T may be provided with a fender 142, over each set of dual wheels at each side, and also with a running board 143, extending forwardly from each fender 142, as in FIG. 2. As in FIG. 4, an axle 144 extends between each pair of wheels on opposite sides of the tension trailer T, while the axles 144 may be mounted on leaf springs 145 attached to the underside of the lower side beams 15.

Figure 8:
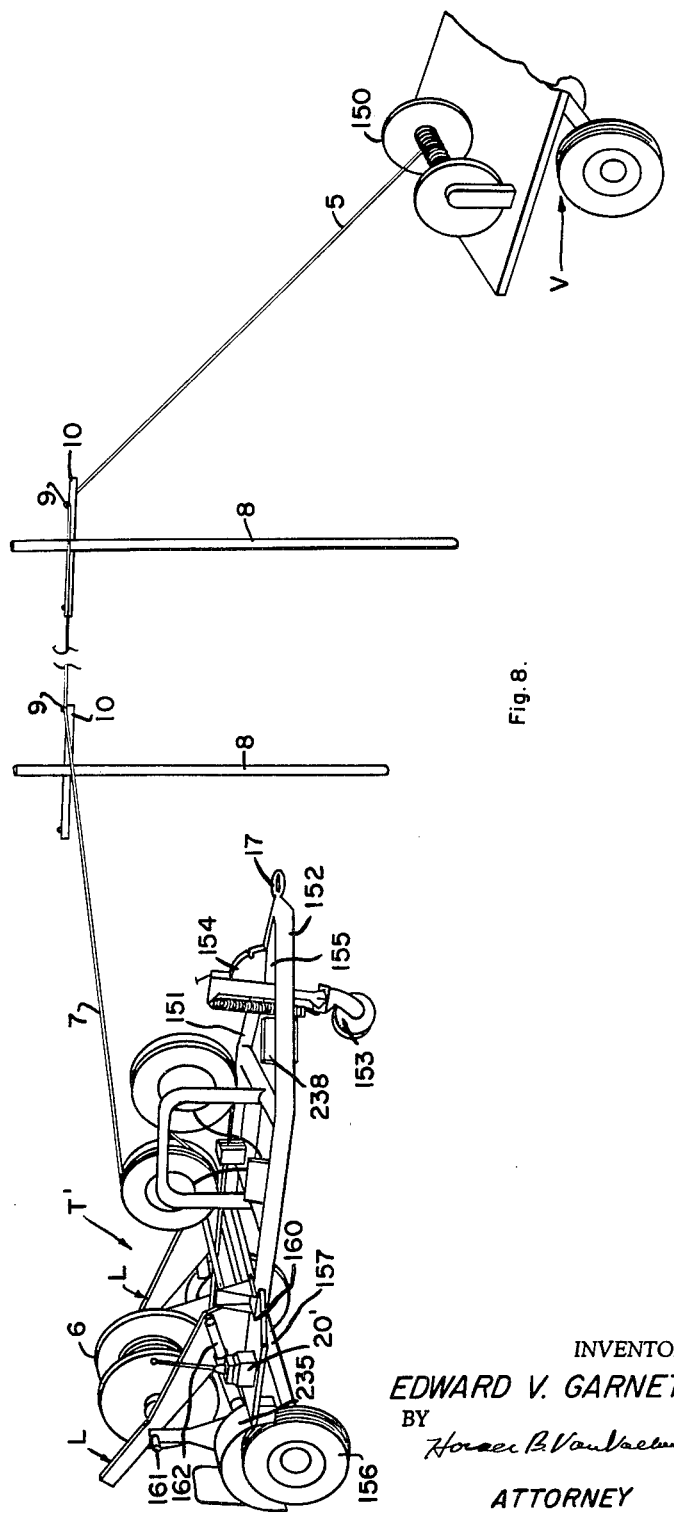
FIG. 8 is a condensed, perspective view of single conductor tensioning equipment constructed in accordance with this invention and illustrating the operation of the same, the distance between a tension trailer and a vehicle on which a pulling winch is mounted being shortened for clarity of illustration.

For pulling a single conductor, an alternative tension trailer T′ of FIG. 8 may be used in conjunction with a vehicle V, on which is mounted a winch 150 for pulling in a rope 5, connected to a single conductor 7 which is unwound from a reel 6 mounted on tension trailer T′. As before, rope 5 pulls conductor 7 through insulators or pulleys 9 mounted on cross arms 10 of poles 8; it being noted that there will normally be a considerably greater number of poles 8 than shown, particularly when rope 5 is a convenient length, such as 2500 feet, to enable a half mile of conductor to be pulled into position. The winch 150 is conveniently driven at about constant speed, with the tension on conductor 7 being regulated at tension trailer T′. Tension trailer T′, as in FIGS. 8 and 9, conveniently includes a frame having side beams 151, from the front ends of which angular beams 152 converge forwardly for connection together at the front, with a hook 17 for pulling purposes also being connected to the front ends thereof. A retractable front wheel 153 is mounted on a support 154, in turn mounted on a platform 155 extending between the front ends of angular beams 152. Rear wheels 156 are mounted on an axle 157, which is connected to the underside of side beams 151 by springs 158 of FIG. 10. Also, jack legs 159 may be connected to the rear ends of side beams 151, the jack legs 159 being retracted during transportation but extended into engagement with the ground during stringing of the conductor. A platform 160 is attached to one of the side beams 151, just forward of one of wheels 156, to support a hand operated pump 20″ of FIG. 8, by which hydraulic fluid pressure is produced, for movement of the front wheel 153 and a pair of lifting arms L for a reel shaft 161. The lifting arms L are elevated and also lowered by hydraulic cylinders 162 of FIGS. 9 and 10, while lifting arms L may be secured in an upper position by pins 163, provided with handles 164 and mounted at the upper ends of posts 165, which extend upwardly from the respective side beams 151. From reel 6, the conductor 7 passes through a series of guide rollers, which will be described later, then in a "figure 8" relation around a front or first resilient annulus 166 having a central, circumferential groove 167 therein and thence around a rear or second resilient annulus 168, also having a central, circumferential groove 167 therein, with the conductor extending around the annulus 166 and 168 within each groove 167. A conventional tractor tire, having a groove similar to groove 167 therein, is conveniently used for each of the front and rear annuli 166 and 168. Each annulus 166 and 168 is provided with a brake, as will be hereinafter described, and the resilient annuli, each of which is in extended engagement with the conductor 7 and preferably in excess of 180°, insure that the resistance to rotation porduced by the brakes will result in a corresponding tension on conductor 7 as it leaves the tension trailer.

Spaced cross beams 170 and 171, on which the annulus 166 and annulus 168 are mounted, as described later, extend transversely between side beams 151, with cross beam 170 being disposed adjacent the front ends of side beams 151 and the cross beam 171 being spaced rearwardly therefrom. A shaft 172, shown in dotted lines in FIG. 10 and also shown in FIG. 11, which is conveniently tubular, also extends between side beams 151 at the front ends of lifting arms L and provides a pivot for a sleeve 173, to the opposite ends of which the respective lifting arms L are attached. Each lifting arms L may be similar to the lifting arms of the hydraulic cable reel trailer of U.S. Patent No. 2,913,194, and thus include, as in FIG. 11, a triangular box 174, conveniently formed of triangular plates having side flanges and welded together, is attached at one acute corner to sleeve 173, while a channel 175 extends from the opposite acute corner. The outer end of channel 175 is conveniently closed by a plate 176 and a position spaced from the inner end closed by a plate 177, while a lower flange plate 178 extends along the lower front of channel 175, between plates 176 and 177, and an upper flange plate 179 extending along the upper edge of channel 175, between inner plate 177 and a point spaced from outer plate 176. The upper flange of channel 175 is also cut back to form an entrance slot 180 for the end of reel shaft 161, which is conveniently provided with a groove having an inner diameter corresponding to the space between flanges 178 and 179. As will be evident, when such a reel shaft is inserted in slots 180 at the ends of channels 175, the aforesaid groove will fit between flanges 178 and 179. As will be evident from FIGS. 9 and 10, with reel 6 positioned on the ground rearwardly of trailer T', the lever arms L may be raised until each slot 180 engages the corresponding end of the reel shaft and the reel shaft and reel then lifted by arms L, outer plate 176 preventing the reel shaft from falling rearwardly out of the lifting arms. As soon as lifting arms L are raised slightly above a horizontal position, the reel shaft will roll down channels 175 until the end of the reel shaft engages a stop 181 adjacent plate 176 and disposed between the web of channel 175 and flange plates 178 and 179. As in FIG. 11, each side of box 174 is provided with a hole 182, at the upper corner of the triangle, in which a pin 183 of FIG. 10 is secured, as by welding, for pivotal attachment of hydraulic cylinder 162, the opposite end of which is pivotally connected to a bracket 184, mounted on the corresponding side beam 151. For engagement with the corresponding pin 163, a hole 185 is provided in the web of channel 175, which hole 185 may be reinforced by a strip 186 attached to the outside of the web of channel 175 and then extending upwardly and inwardly above the top of channel 175, then directly downwardly to the upper edge of flange plate 179, to form an inclined guide 187 for the inner end of locking pin 163.

As the conductor 7 is unwound from the bottom of reel 6, as in FIGS. 8 and 10, it passes between a pair of horizontal rolls 190 and 191, which are vertically spaced and extend the width of side beams 151, as in FIG. 12, being mounted in bearing 192 mounted on brackets 193, in turn mounted on side beams 151. The rollers 190 and 191 permit the connector 7 to move from side to side as it is unwound from the reel 6, but restrain upward or downward movement of the conductor, as it unwinds, to an area corresponding to a plane extending forwardly to the underside of the front resilient annulus 166. After passing beneath rear annulus 168 and also moving from side to side in accordance with the position on reel 6 from which it is unwound, as in FIG. 10, the conductor 7 then passes between a pair of laterally spaced, vertical rolls 194 and an associated pair of vertically spaced, horizontal rolls 195, the centers of which are aligned with the bottom of groove 167 in resilient annulus 166. As will be evident, rolls 194 and 195 guide conductor 7 for engagement with groove 167 in the annulus 166. Vertical rolls 194, as in FIG. 14, are preferably provided with a covering layer 196 of rubber or the like, while horizontal rolls 195 and also rollers 190 and 191 are preferably provided with a similar covering layer to prevent damage to conductor 7. To support rolls 194 and 195 for rotation, a longitudinal beam 197, shown in dotted lines in FIG. 9, extends between cross beams 170 and 171, while a bracket plate 198 extends upwardly from beam 197, as in FIG. 13, and is attached thereto in a suitable manner, as by welding. Bracket plate 198 extends transversely of beam 197, while a pair of longitudinal bracket plates 199 may also be welded to the top of beam 197, at positions spaced from each side of the center, with the bracket plates 198 and 199 supporting a lower platform 200, in which is mounted lower bearings 201 for shafts 202 of vertical rolls 194. A pair of uprights 203, conveniently angles as in FIG. 14, are mounted on platform 200 and support bearings 204 for shafts 205 of rolls 195 and also support a top plate 206, as in FIG. 26, on which are mounted upper bearings 201' for shafts 202 of rolls 194.

Figure 15:
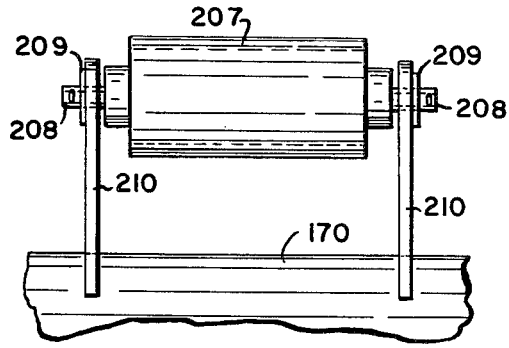
FIG. 15 is a fragmentary rear view, on an enlarged scale, taken from the position of line 15—15 of FIG. 10 and showing a lower roller which holds the conductor in engagement with a first grooved, resilient annulus, such as a tractor tire.

As will be evident, the conductor 7 is aligned generally with groove 167 in annulus 166, at a position generally tangent to the lower point of the circumference thereof, while conductor 7 is also held in engagement with annulus 166 and particularly groove 167 therein, by a roller 207, as in FIG. 10, which may be provided with a covering of rubber or other resilient material to prevent damage to the conductor. As in FIG. 15, roller 207 is mounted on a shaft 208 received in bearings 209 mounted on bracket plates 210, in turn extending upwardly from cross beam 170 and attached thereto in a suitable manner, as by welding. As described previously and also shown in FIG. 10, conductor 7 extends in a "figure 8" relationship about the resilient annuli 166 and 168, thus extending from the point of engagement at which roller 207 presses against the lower point of the circumference of annulus 166, around annulus 166 for greater than 180°, such as almost 270°, to the point of approach to the annulus 168, then into groove 167 in annulus 168 and around annulus 168 for greater than 180°, such as about 220°, to a point on the upper rear edge thereof. At the latter position, a roller 211 is mounted for engagement with the annulus 168 to maintain conductor 7 in groove 167 until the conductor leaves the annulus. Depending upon the position of tension trailer T' with respect to the first pole 8 and the height of the first insulator or pulley through which the conductor passes, the angle at which conductor 7 leaves the periphery of annulus 168 may vary somewhat, although it is generally as shown in FIG. 10. The upper roller 211, as in FIGS. 10 and 17, is mounted for rotation between brackets 212 extending downwardly at an angle from a horizontal arm 213, attached to the upper end of a post 214 which extends upwardly in angular relation, such as 45° to the horizontal, from a support for the annuli or tires 166 and 168, arm 213 and post 214 being conveniently tubular.

Figure 16:
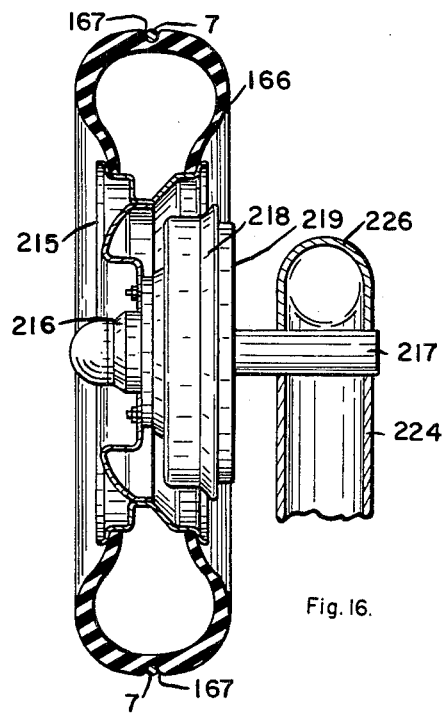
FIG. 16 is a fragmentary vertical section, on an enlarged scale, taken along line 16—16 of FIG. 10.

The front annulus or tire 166, as in FIG. 16, may be mounted on a conventional wheel 215 provided with a rim for the tire, and attached, as by bolts, to a hub 216 mounted for rotation on a fixed spindle 217. Hub 216 is also provided with a brake drum 218, while a brake backing plate 219 is mounted on spindle 217, a conventional mechanical brake arrangement being mounted on brake backing plate 219 within drum 218. As in FIG. 18, the rear annulus or tire 168 is mounted on a similar wheel 215 provided with a rim for a tire, in turn mounted on a hub mounted for rotation on a spindle 220, with a brake backing plate 219 mounted on spindle 220 and the hub provided with a brake drum 218. The spindle 220 for the rear annulus or tire 168 is mounted in a slightly higher position than the spindle 217 for the front annulus or tire 166, so that the conductor 7, as in FIG. 10, will pass below rear annulus or tire 168, when moving between the horizontal rolls 190 and 191 and the roll assembly which includes vertical rolls 194 and horizontal rolls 195. The support for spindles 217 and 220 for the respective annuli or tires 166 and 168, as in FIGS. 10 and 18, conveniently includes a pair of upright posts 224 and 225, extending upwardly from the respective cross beam 170 and 171 and connected together at the top by a cross bar 226, each end of which extends downwardly for connection to the upper end of the respective post and connection thereto in a suitable manner, as by welding, posts 224 and 225 and cross bar 226 being conveniently tubular. For installing spindles 217 and 220 at different heights, a rectangular cutout 227 may be made in the upper edge of post 224 on opposite sides, so that spindle 217 may be placed therein and welded to the upper end of post 225. A similar cutout 228, but in each side of the opposite lower depending end of cross bar 226, may be provided for centering and welding spindle 220 in position. As will be evident, after the spindles 217 and 220 have been wleded in position in cutouts 227 and 228, the cross bar 226 may be attached, as by welding, to the upper ends of posts 224 and 225. Also, post 214 for the upper roller 210 may be attached, as by welding, to the rear corner of cross bar 226, as in FIG. 18.

For controlling the pressure of the mechanical brake for each annulus or tire 166 and 168, an arrangement similar to that previously described in connection with FIG. 6 and 7 may be used, thus including a pair of adjusting bolts 126' extending through the top of a box-shaped bracket 230, mounted on the adjacent side beam 151 as in FIG. 9, with each adjusting bolt being engaged by a handle nut 129'. The lower end of each adjusting bolt 126' is connected to one leg of a forked link, similar to forked link 125 of FIG. 6 and mounted within bracket 230, while the opposite leg of the forked link, in lieu of being connected to a solid rod, such as rod 124 of FIG. 6, is instead connected to flexible wire cable 231 or 232, which leads to the respective brake, as in FIG. 9.

The tension trailer T', as in FIGS. 8 and 9, may be provided with fenders 235, disposed over the wheels 156 and hydraulic lines 236 and 237, respectively, leading from the hand pump 20' to the respective hydraulic cylinders 162 for raising and lowering the lifting arms L and the front wheel 153. A battery 238 may be mounted on one of the front beams 152, to provide current for automatically applying the electrically operated brakes of the wheels 156, in the event that the trailer becomes accidentally detached from the towing vehicle.

As will be evident, the tension trailer of this invention fulfills to a marked degree the requirements and objects hereinbefore set forth. The tensioning equipment of this invention which is adapted to handle a plurality of reels simultaneously is conveniently mounted on a trailer, while the split bearings permit the reels to be loaded readily and the empty reels also to be unloaded readily. The brakes for the individual reels can be adjusted readily so that the braking effect on each reel is essentially uniform. In another type of tension trailer adapted to handle a single reel, the braking effect is readily applied and may be adjusted to any desired tension by the brakes. In the single conductor tension trailer, the passage of the conductor about two resilient annuli or tires, each having a groove therein, and in a substantially "figure 8" arrangement, insures adequate frictional engagement of the conductor with the tires and thus insures that the braking effect will be transmitted to the conductor. The lower rollers for the front annulus and the upper roller for the rear annulus insure that the conductor will engage each annulus for the full amount of the desired circumference, while the horizontal rollers forwardly of the reel insure that the conductor will be unwound from the reel in a generally horizontal plane. The combination of two associated pairs of rollers, one pair being horizontal and the other vertical, also insures that the conductor will be guided into the groove of the desired annulus. By covering both the longer horizontal rollers and the two pairs of vertical and horizontal rollers with rubber or similar resilient material, damage to the conductor is prevented.

Although a preferred embodiment of a multiple conductor tension trailer and a single conductor tension trailer have been illustrated and described, it will be understood that other embodiments may exist and various changes made therein, without departing from the spirit and scope of this invention.

1. In apparatus for pulling a conductor under tension, means for supporting a reel from which said conductor is unwound; a first rotatable resilient annulus having a conductor receiving groove circumferentially therearound and having its axis parallel to the axis of said reel; a second rotatable resilient annulus having a conductor receiving groove circumferentially therearound and being mounted intermediate said first annulus and said reel and having its axis parallel to the axis of said first annulus, so that said conductor may extend from a point on said reel, to a corresponding point on said first annulus, then circumferentially around said first annulus for more than 180° and then circumferentially around said second annulus for more than 180°; and means for applying braking effect to each said annulus.

2. In apparatus as set forth in claim 1 wherein each said annulus comprises a pneumatic tire having a circumerential groove for receiving said conductor.

3. In apparatus as set forth in claim 1 wherein said first annulus and said second annulus are disposed generally horizontally with respect to said reel shaft; and including a lower roller bearing against the periphery of said first annulus adjacent its bottom to maintain said conductor in said groove of said first annulus; and an upper roller bearing against the periphery of said second annulus in an upper portion thereof to maintain said conductor in said groove of said second annulus.

4. In apparatus for pulling a conductor under tension, means for supporting a reel from which said conductor is unwound; a first rotatable resilient annulus having a conductor receiving groove circumferentially therearound and having its axis parallel to the axis of said reel; a second rotatable resilient annulus having a conductor receiving groove circumerentially therearound and being mounted intermediate said first annulus and said reel and having its axis parallel to the axis of said first annulus, so that said conductor may extend from a point on said reel to a corresponding point on said first annulus, then circumferentially around said first annulus for more than 180° and then circumferentially around said second annulus for more than 180°; means for applying a braking effect to each said annulus; said first annulus and said second annulus being disposed generally horizontally with respect to said reel shaft and said second annulus is mounted at an elevation higher than said first annulus; and including a pair of juxtaposed vertically spaced, horizontal rollers intermediate said reel and said first annulus at an elevation so that said conductor is guided by said horizontal rollers from the bottom of said reel toward the bottom of said first annulus; a pair of laterally spaced, vertical rollers and a horizontal pair of vertically spaced, horizontal rollers below and intermediate said first annulus and said second annulus for guiding said conductor into said groove at the bottom of said first annulus.

5. In apparatus for pulling a conductor under tension, means for supporting a reel from which said conductor is unwound; a first rotatable resilient annulus having a conductor receiving groove circumferentially therearound and having its axis parallel to the axis of said reel; a second rotatable resilient annulus having a conductor receiving groove circumferentially therearound and being mounted intermediate said first annulus and said reel and having its axis parallel to the axis of said first annulus, so that said conductor may extend from a point on said reel to a corresponding point on said first annulus, then circumferentially around said first annulus for more than 180° and then circumferentially around said second annulus for more than 180°; means for applying braking effect to each said annulus; said first annulus and said second annulus being generally horizontally disposed with respect to said reel shaft; a lower roller bearing against the periphery of said first annulus adjacent its bottom to maintain said conductor in said groove therein; an upper roller bearing against the periphery of said second annulus in an upper portion thereof to maintain said conductor in said groove therein; including a spindle for said first annulus; a spindle for said second annulus; an upright post having a notch at the upper end thereof in which said spindle for said first annulus is received; a second upright post spaced from said first upright post and beneath said spindle for said second annulus; a bar having depending ends connected to the tops of said first and second posts, said depending end of said bar above said second post having a notch therein receiving said second spindle, so as to support said second annulus at a higher elevation than said first annulus; and an arm having an angular upper end connected at its lower end to said bar above said second post and extending upwardly and outwardly so that said angular end will be positioned over said second annulus, said roller engaging said second annulus being mounted in depending relation from the angular upper end of said arm.

6. In wire stringing equipment, a single conductor tension trailer comprising a wheeled frame having laterally spaced side beams, said frame being open at the rear and provided with a transverse shaft extending between said side beams at a position spaced from the rear end thereof and a pair of longitudinally spaced cross beams extending between said side beam forwardly of said shaft; a pair of lifting arms mounted on said first shaft for receiving a shaft on which a reel carrying a conductor is mounted; a post extending centrally and upwardly from each of said cross beams; a spindle extending transversely from a point adjacent the upper end of each said post; a bar connecting the upper ends of said posts; a first resilient annulus mounted on the forward spindle; a second resilient annulus mounted on the rear spindle; means for guiding said conductor from the bottom of said reel to the bottom of said first annulus and from the upper portion of said second annulus, so that said conductor passes in engagement with said first annulus from the bottom thereof and around to a point adjacent said annulus, thence around said second annulus to a point on the upper rear portion thereof and thence forwardly from said second annulus; and means for applying a braking effect to resist the rotation of each said annulus.

References Cited by the Examiner
UNITED STATES PATENTS

| | | | |
|---|---|---|---|
| 481,641 | 8/92 | Schneider | 242—86.5 |
| 2,250,269 | 7/41 | Lockwood | 242—86.5 |
| 2,355,441 | 8/44 | Jacob | 242—86.5 |
| 2,635,827 | 4/53 | Stemm et al. | 242—86.7 |
| 2,948,483 | 8/60 | Petersen | 242—86.7 X |
| 3,025,713 | 3/62 | Koshaba et al. | 74—478 |

MERVIN STEIN, *Primary Examiner.*

JOSEPH P. STRIZAK, *Examiner.*